United States Patent [19]

Krieg

[11] 4,078,630
[45] Mar. 14, 1978

[54] STEERING CONTROL SYSTEM FOR REMOTE CONTROLLED TRANSPORTATION UNITS

[75] Inventor: Walter Krieg, Brugg, Switzerland
[73] Assignee: Digitron AG, Brugg, Switzerland
[21] Appl. No.: 748,202
[22] Filed: Dec. 7, 1976
[30] Foreign Application Priority Data
  Dec. 9, 1975  Germany .......................... 2555365
[51] Int. Cl.² ............................................. B62D 1/28
[52] U.S. Cl. ...................................... 180/98; 180/6.5
[58] Field of Search ......................... 180/98, 6.48, 6.5
[56] References Cited
  U.S. PATENT DOCUMENTS
  3,614,990  10/1971  Schnitzler .............................. 180/98
  3,628,624  12/1971  Wesener .................................. 180/98
  3,912,037  10/1975  Krieg ..................................... 180/98

*Primary Examiner*—Joseph F. Peters, Jr.
*Assistant Examiner*—Donn McGiehan
*Attorney, Agent, or Firm*—Hubbell, Cohen, Stiefel & Gross

[57] ABSTRACT

An improved steering control system for a remote controlled transport unit for moving said unit along a pair of guide lines fixed in space comprises two drive wheel means, one of the two drive wheel means having a first control angle $\alpha$ associated therewith, the other of the two drive wheel means having a second control angle $\beta$ associated therewith, the control angles corresponding to the angular direction of travel of their associated drive wheel means with respect to a common longitudinal axis fixed relative to the transport unit; means for controlling the direction of travel of the two drive wheel means whereby the direction of travel of one of the drive wheel means will be along one of the pair of guide lines and the direction of travel of the other of the drive wheel means will be along the other of the pair of guide lines; and means for controlling the drive speed $v_A$ of the one drive wheel means relative to the drive speed $v_B$ of the other drive wheel means in accordance with the equation $$v_A = v_B \cdot \cos\beta/\cos\alpha$$

6 Claims, 5 Drawing Figures

STEERING CONTROL SYSTEM FOR REMOTE CONTROLLED TRANSPORTATION UNITS

BACKGROUND OF THE INVENTION

1. Field of the Invention

This invention pertains to steering control systems and more particularly to steering control systems for use with remote controlled transportation units. Most particularly the present invention relates to a steering control system for remote controlled transportation units which are movable along guide lines fixed in space, which units have in each case two drive wheels and possibly additional non-driven wheels, each drive wheel having associated therewith at least one antenna which is movable with the drive wheel and cooperates with one of the guidelines to pick up control signals issuing therefrom.

2. Prior Art

The applicant has already proposed a steering control system for remote controlled transportation in which each transportation unit is provided with two drive wheels which can be guided along a single guide line which is fixed in space. The steering control system is so developed that in each case the leading drive wheel, which is controlled by the guide line, is connected as control wheel while the lagging wheel is connected as slave wheel.

In order to increase the maneuverability of the transportation units, and in particular to improve travel around even sharp curves, internal unpublished studies with transportation units have already been carried out in which the two simultaneously driven drive wheels are controlled by two separate guide lines. In these experiments, however, difficulties arose, particularly in connection with both controlling travel around curves and with lateral displacements occurring oblique to the straight-ahead direction.

The difficulties arose from the fact that when the drive speeds of the driven wheels are not precisely controlled there is an undesired turning or shifting of the entire transport unit which leads to the transport unit moving entirely out of the region in which the remote control is active.

The object of the present invention is therefore to disclose a steering control system of the type mentioned above wherein each transportation unit is self-regulated whereby to correct deviations from the desired direction of travel.

SUMMARY OF THE INVENTION

In accordance with the present invention, I have developed an improved steering control system in which each drive wheel has associated therewith a guide line which influences the control angle of the drive wheel, the drive speed $v_A$ of a predetermined drive wheel is freely controllable, and wherein the drive speed $v_B$ of the other drive wheel is controllable in accordance with the relationship $$v_A \cdot \cos\alpha = v_B \cdot \cos\beta \tag{1}$$

in which $\alpha$ and $\beta$ are control angles representing the angular directions of travel of the two drive wheels relative to a common longitudinal axis which is fixed with respect to the transport unit.

In the control system of the invention, the control angles of the two drive wheels, which angles are independent of each other, are in each case taken into consideration in that the drive wheels are driven with different speeds when the control angles of the drive wheels are different. The interrelationship of the two drive speeds is so selected that if an oblique position of the transport unit should result, for example, from one drive wheel having a speed in excess of the other drive wheel, the drive speed of said one drive wheel will be automatically reduced. Thus, when deviations from the predetermined drive speeds occur, correction of the condition is automatically effected whereby the control system of the invention makes substantially improved travel around curves, even narrow curves, possible.

When employing the present system to control a transport unit it has been found particularly desirable to arrange both drive wheels on a line extending parallel to the longitudinal axis of said unit.

In a preferred embodiment a different control signal frequency is associated with each guide line, each drive wheel having an antenna associated therewith which antenna is tuned to the control signal frequency of its associated guide line. By employing this arrangement, the guide lines may be juxtaposed without adversely effecting the operation of the system.

Further features and advantages of the present invention will become more fully apparent from the following detailed description and annexed drawings of a preferred embodiment thereof.

DETAILED DESCRIPTION OF THE PREFERRED EMBODIMENT

Figure 1:
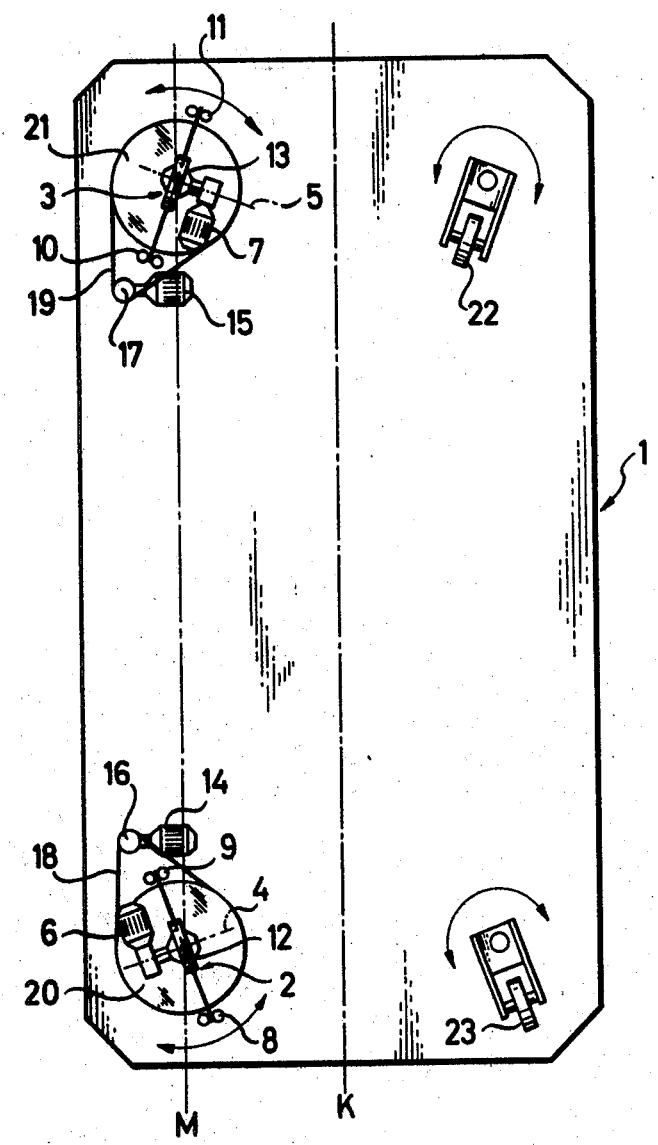
FIG. 1 is a diagrammatic view of the bottom of a transport unit.

Referring now to the drawings in detail and initially to FIG. 1 thereof, a transport unit, viewed from the bottom, is designated by the reference numeral 1. On a line M extending parallel to the longitudinal central axis K there are arranged two drive wheels 2 and 3 whose axes of rotation 4 and 5 extend parallel to the bottom of the transport unit 1. The drive wheels 2 and 3 are driven, for example, by drive motors 6 and 7 respectively. As presently preferred and shown, a pair of antennas are arranged on each drive wheel. Thus, antennas 8 and 9 are arranged on drive wheel 2 and antennas 10 and 11 are arranged on drive wheel 3. In each case, one antenna leads and one antenna lags its associated drive wheel depending on its direction of travel. Preferably, each antenna comprises two induction coils arranged on opposite sides of the central plane passing through its associated drive wheel, the antennas being so coupled with their corresponding drive wheels that they can be rotated, together therewith, through any desired control angle. The drive wheels 2 and 3, together with their associated drive motors and antennas are rotatable about the shafts 12 and 13 respectively, which shafts are perpendicular to the plane of the drawing of FIG. 1. While rotation of the wheels 2 and 3 about the shafts 12 and 13 may be effected in a variety of well known ways, the pulley arrangement illustrated in FIG. 1 is preferred. Thus, rotation of drive wheel 2 is controlled by the control motor 14. As shown, the motor 14 drives the pulley 16 which drives the belt 18 which in turn drives the pulley 20 upon which drive wheel 2 is mounted. A similar arrangement consisting of control motor 15, pulley 17, belt 19 and mounting pulley 21 is employed to effect rotation of drive wheel 3.

On the side of the longitudinal central axis K opposite the drive wheels 2 and 3, two non-driven wheels, such as the caster wheels 22 and 23 are disposed. Although two non-driven wheels are preferred and shown, any desired number of non-driven wheels may be employed. The arrangement of the drive wheels 2 and 3 on a line M parallel to the central longitudinal axis K has been selected merely by way of preference. Thus, the line M may be somewhat offset with respect to the central longitudinal axis K, as for example on a diagonal of the transport unit 1. However, it has been found advisable, particularly for good straight-ahead travel of the transport unit 1 in a direction parallel to the central longitudinal axis K, to arrange the drive wheels in the manner shown.

The control of the drive wheels 2 and 3 and hence of the transport unit 1 is such that in operation the leading antenna associated with each drive wheel scans a guide line, comprising, for example, an electric line, which line is preferably disposed in a suitable recess. The signal detected by each leading antenna is transmitted to its associated control motor such that the associated drive wheel is rotated to orient the scanning antenna above its associated guide line. The speed of each drive wheel is controllable via control signals which preferably are also detected by the antennas. Of the two antennas which are associated with each drive wheel, one is active during forward travel of the transport unit 1, the other during rearward travel.

Figure 2:
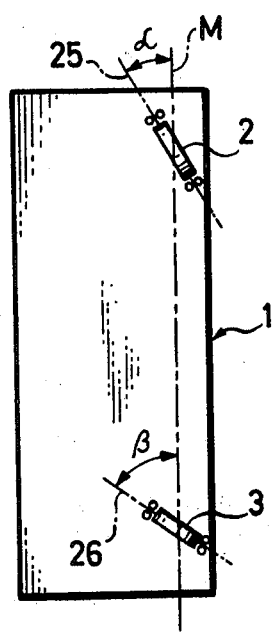
FIG. 2 is a diagrammatic view showing different control angles for the two drive wheels A and B.

In order to more fully explain the control system of the invention, a transport unit 1 with the drive wheels 2 and 3 indicated schematically is illustrated in FIG. 2. As shown therein, the angular deviation of the radially central plane 25 of the drive wheel 2 from the line M comprises the control angle $\alpha$ of said drive wheel 2. Similarly, the deviation of the radially central plane 26 of the drive wheel 3 comprises the control angle $\beta$. If the drive speed of the drive wheel 2 is designated as $v_A$ and that of the drive wheel 3 as $v_B$, then the drive speeds of the two drive wheels should be coupled such that they statisfy the relationship $$v_A \cdot \cos\alpha = v_B \cdot \cos\beta \tag{1}$$

It will be readily apparent to the skilled art worker that numerous means are available for controlling the drive speeds of the wheels 2 and 3 according to this equation. Preferably, the wheels 2 and 3 are coupled whereby either drive wheel may be freely controlled, the other drive wheel then being driven such that the above equation will be satisfied. Thus, assuming that wheel 2 is the freely controlled wheel and is driven at speed $v_A$, then the speed of wheel 3 should be controlled at $$v_B = (v_A \cdot \cos\alpha/\cos\beta) \tag{2}$$

Alternatively, if wheel 3 is the freely controlled wheel, the speed of wheel 2 should be controlled at $$v_A = (v_B \cdot \cos\beta/\cos\alpha) \tag{3}$$

It is therefore apparent that when the control angles $\alpha$ and $\beta$ are equal, the drive wheels 2 and 3 will travel with the same speed, and that when the control angles $\alpha$ and $\beta$ differ, the drive wheels 2 and 3 will automatically travel with different speeds.

Figure 3:
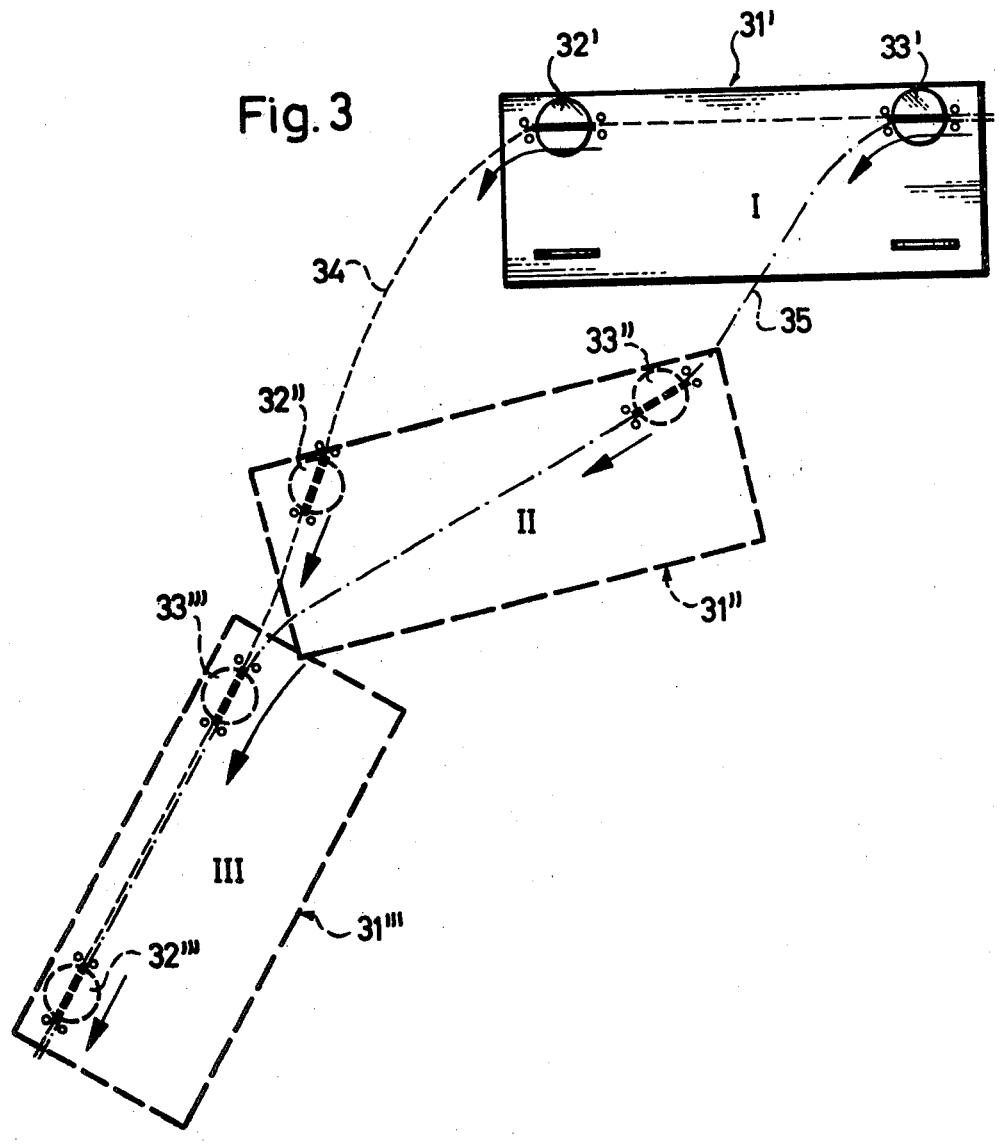
FIG. 3 is a view similar to FIG. 2 showing different positions of the transport unit as it passes around a curve.

FIG. 3 shows how it is possible to drive the transport unit 1 around relatively sharp curves by following the teaching of the present invention. In FIG. 3, the transport unit 1 is shown in three successive positions (I, II, III) as it passes around the curve, the reference numerals corresponding to these three positions being designated by single, double and triple prime marks, respectively. In FIG. 3, the transport unit is designated by the reference numeral 31, the drive wheels being designated by the reference numerals 32 and 33. As shown, the drive wheel 32 is guided on a first guide line or loop 34 and the second drive wheel 33 is guided on a second guide line or loop 35, the arrows indicating the direction of movement of the two drive wheels. When the transport unit is driven on a straight line, the guide lines 34 and 35 extend close and parallel to each other as is best shown at position III. The guide lines extend along different paths only when the unit 31 must pass around a curve. In position I the transport unit 31' is on the last portion of a straight-ahead section. Since the control angles of both wheels 32' and 33' are zero at this point, the speeds of the two drive wheels will be the same.

With the unit 31" at position II, it can be seen that the drive wheel 32" has a larger control angle than the drive wheel 33". In accordance with equation (1) this means that the drive speed of the drive wheel 32" will be greater than the drive speed of the drive wheel 33". The result is that the transport unit 31" is moved as rapidly as possible back into a position in which its central longitudinal axis extends parallel to the guide lines 34 and 35, as shown in position III. Due to the different drive speeds of the drive wheels as the unit 31 passes around a curve, no undesired turning or displacement of the drive unit 31 takes place.

Figure 4:
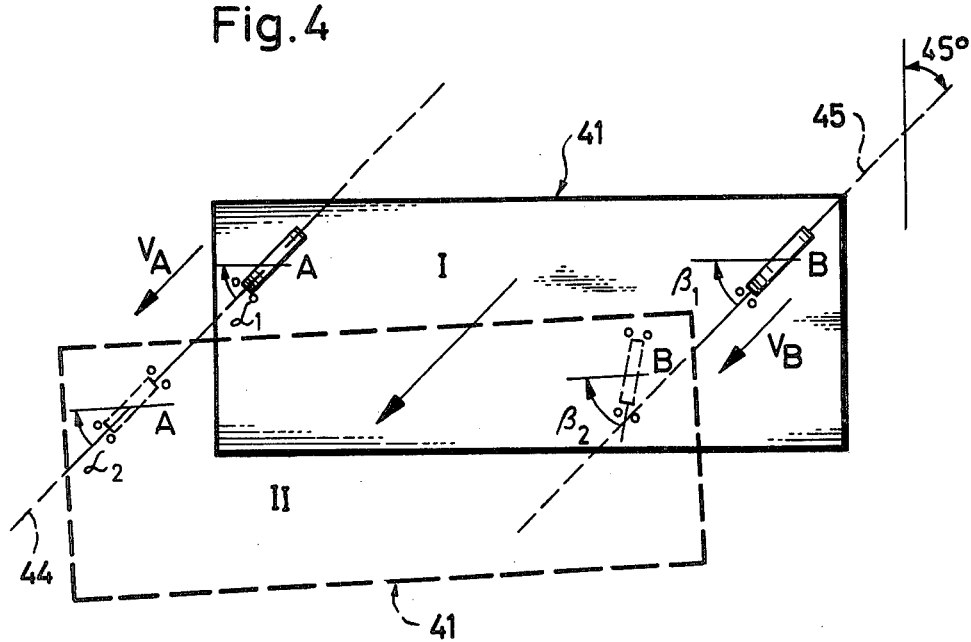
FIG. 4 is a view similar to FIG. 2 showing transverse travel of the transport unit.

With reference now to FIG. 4 the advantage obtained by the invention in the case of the transverse travel of a transport unit is illustrated. As shown, a transport unit 41 having the drive wheels A and B is again shown in two successive positions, position I at time $t_I$ being shown in solid lines and position II at time $t_{II}$ being shown in dashed lines. In position I the control angles $\alpha$ and $\beta$ of the drive wheels A and B respectively are the same, namely 45°. Accordingly, the drive speeds $v_A$ and $v_B$ are also the same. The transport unit is thus being displaced laterally at an angle of 45° with respect to its central longitudinal axis. If now, as a result of any disturbance, it happens that the drive wheel A is driven with a higher speed than the drive wheel B, then since the antenna of drive wheel A will strive to remain on its associated guide line 44, the control angle $\alpha 2$ will decrease as compared with $\alpha 1$. At the same time, however, since the antenna of the drive wheel B also tries to remain on its guide line 45, the control angle $\beta 2$ of drive wheel B will increase as compared with the control angle $\beta 1$. Thus, as compared with position I, the unit in position II is turned. Without correction of this suddenly occurring condition, this turning could increase continuously until a condition can come about in which the antenna of the drive wheel 3 can no longer follow its guide line 45 with the result that the transport unit 41 loses contact with the control system. In accordance with the present invention, due to the coupling between the speeds of the drive wheels as described above, the result is that upon occurrence of the condition corresponding to position II the drive speed of the drive wheel B is increased (or the drive speed of the drive wheel A is reduced) until the unit 41 again obtains the condition of equilibrium shown in position I.

In general, it can be noted from equation (2) that for a constant speed $v_B$ the speed $v_A$ increases whenever the angle $\alpha$ exceeds the angle $\beta$, and from equation (3) that for a constant speed $v_A$ the speed $v_B$ decreases whenever the angle $\beta$ exceeds the angle $\alpha$. This leads in each case to a neutralization of errors in the speeds of the drive wheels.

Figure 5:
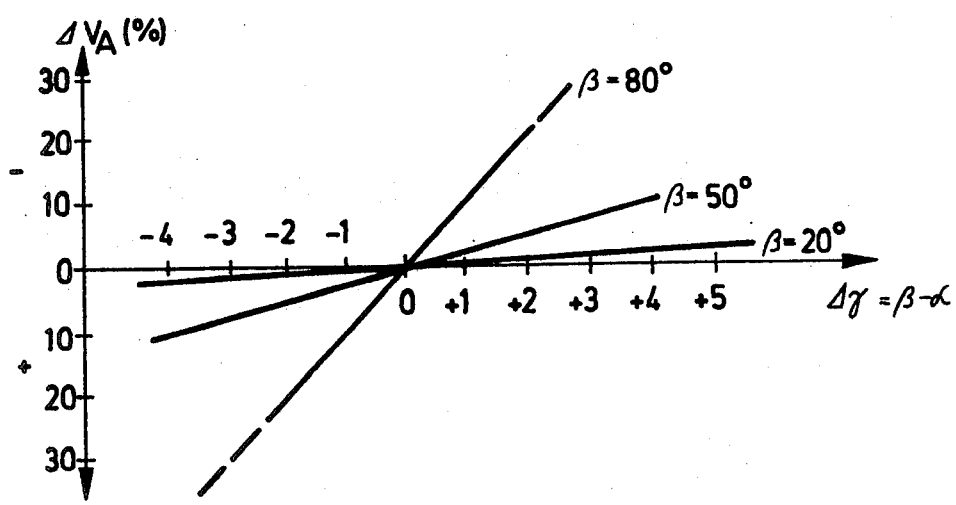
FIG. 5 is a graph which shows the change in the speed of a drive wheel as a function of the angular difference between the two control angles during transverse travel of a transport unit.

In FIG. 5 there is shown a diagram which indicates the percentage change in speed $v_A$ of the drive wheel A as a function of the angular difference $\Delta\gamma = \beta - \alpha$ for different values of $\beta$. In FIG. 5 three curves are indicated in which the parameter is in each case the transverse-displacement control angle $\beta$ of FIG. 4. The curves are given for $\beta = 20°$, $\beta = 50°$, and $\beta = 80°$. As shown in FIG. 5, the smallest change $\Delta v_A$ in the speed $v_A$ of drive wheel A as a function of the angular difference $\beta - \alpha$ occurs at small values of $\beta$, namely $\beta = 20°$. The greatest change, on the other hand, occurs at $\beta = 80°$. The diagram thus shows that with large control angles, for instance $\beta = 80°$, a correspondingly large speed compensation takes place.

At the same time, however, it follows from this graph that the maximum permissible control angle must be less than 90°, since with this angle even very small angular errors would cause comparatively large changes in the speed of one of the two drive wheels. Therefore, 80° is advisedly selected as a suitable maximum control angle.

As noted above, either drive wheel may be freely controlled, the other then being regulated in accordance with equation (1). Preferably, however, the control is effected such that the recommended speed is maintained by the faster of the two drive wheels A and B, the drive speed of the other drive wheel being controlled as a function thereof.

While I have herein shown and described the preferred embodiment of the present invention and have suggested modifications therein, it will be apparent that other changes and modifications may be made therein within the scope of the appended claims without departing from the spirit and scope of this invention. Therefore, the above description is to be contrued as illustrative and not in a limiting sense.

What is claimed is:

1. An improved steering control system for a remote controlled transport unit for moving said unit along a pair of fixed guide lines, comprising: two drive wheel means for moving said unit, one of said two drive wheel means having a first control angle associated therewith, the other of said two drive wheel means having a second control angle associated therewith, said control angles corresponding to the angular direction of travel of their associated drive wheel means with respect to a common longitudinal axis fixed relative to said transport unit; means for controlling the direction of travel of said two drive wheel means, whereby the direction of travel of one of said drive wheel means will be along one of said pair of guide lines and the direction of travel of said other of said drive wheel means will be along said other of said pair of guide lines; and means for controlling the drive speed of said one drive wheel means relative to the drive speed of said other drive wheel means in accordance with the equation $$v_A = v_B \cdot (\cos \beta / \cos \alpha)$$

in which $\alpha$ is the control angle of said one of said drive wheel means, $\beta$ is the control angle of said other of said drive wheel means, $v_A$ is the drive speed of said one of said drive wheel means, and $v_B$ is the drive speed of said other of said drive wheel means.

2. The steering control system of claim 1 wherein said two drive wheel means are disposed on said transport unit on a line substantially parallel to said longitudinal axis.

3. The steering control system of claim 1 wherein said travel direction controlling means includes at least one antenna mounted on each of said drive wheel means, the axis of each of said antennas coinciding with the direction of travel of the drive wheel means upon which it is mounted; and signal generating means associated with each of said guide lines for generating signals detectable by said antennas to align the axis of each of said antennas with its associated guide line.

4. The steering control system of claim 3 wherein each of said antenna means cooperates inductively with its associated guide line.

5. The steering control system of claim 3 wherein each of said generated signals has a different frequency and wherein each of said antennas is tuned to the signal frequency of its associated guide line.

6. An improved method of remotely controlling a transport unit for moving the unit along a pair of guide lines fixed in space, said transport unit having two drive wheel means for moving said unit, said method comprising: controlling the direction of travel of said two drive wheel means whereby the direction of travel of one of said drive wheel means will be along one of said pair of guide lines and the direction of travel of the other of said drive wheel means will be along said other of said pair of guide lines; measuring the angular direction of travel of said one drive wheel means with respect to a longitudinal axis fixed relative to the transport unit; measuring the angular direction of travel of said other drive wheel means relative to said longitudinal axis; and controlling the drive speed of said one drive wheel means relative to the drive speed of said other drive wheel means in accordance with the equation $$v_A = v_B \cdot (\cos \beta / \cos \alpha)$$

in which $\alpha$ is the angular direction of travel of said one drive wheel means, $\beta$ is the angular direction of travel of said other drive wheel means, $v_A$ is the drive speed of said one drive wheel means, and $v_B$ is the drive speed of said other drive wheel means.

* * * * *